(12) United States Patent
Autterson et al.

(10) Patent No.: US 6,736,925 B2
(45) Date of Patent: May 18, 2004

(54) METHODS OF BONDING METAL SURFACES, AND COMPONENTS THEREFOR

(76) Inventors: Christopher S. Autterson, 48503 Cider Mill, Novi, MI (US) 48374; John A. Haapala, 35477 Tall Pine Rd., Farmington Hills, MI (US) 48335; Jeffery Perenic, 4217 Cooper Ave., Royal Oak, MI (US) 48073

( * ) Notice: Subject to any disclaimer, the term of this patent is extended or adjusted under 35 U.S.C. 154(b) by 0 days.

(21) Appl. No.: 10/193,725

(22) Filed: Jul. 10, 2002

(65) Prior Publication Data

US 2002/0170669 A1 Nov. 21, 2002

Related U.S. Application Data

(62) Division of application No. 10/039,722, filed on Oct. 24, 2001, now Pat. No. 6,669,428.
(60) Provisional application No. 60/244,998, filed on Nov. 1, 2000.

(51) Int. Cl.[7] .................................................. C09J 5/10
(52) U.S. Cl. ..................... 156/306.9; 156/249; 156/556
(58) Field of Search ............................... 156/161, 306.9, 156/230, 238, 247, 249, 391, 541, 556; 269/47, 59

(56) References Cited

U.S. PATENT DOCUMENTS

| | | | | |
|---|---|---|---|---|
| 3,950,204 A | * | 4/1976 | Williams | 156/330 |
| 5,548,026 A | * | 8/1996 | Jorissen et al. | 525/113 |
| 5,783,033 A | * | 7/1998 | Grossman | 156/556 |
| 6,428,650 B1 | * | 8/2002 | Chung | 156/250 |
| 6,485,589 B1 | * | 11/2002 | Johnson et al. | 156/83 |

* cited by examiner

Primary Examiner—Jeff H. Aftergut
Assistant Examiner—John L. Goff
(74) Attorney, Agent, or Firm—Weiner & Burt, P.C.; Irving M. Weiner; Pamela S. Burt

(57) ABSTRACT

The bonding of steel locating hinge washers to a hinge assembly to facilitate doors-off/door-on processing through an automotive trim shop. The adhesive bonding system cures during the cathodic electro-coat primer bake cycle. The adhesive maintains an intimate, positive contact with both metal surfaces ensuring adequate bonding performance and maximized bonding surface area during a defined heat or bake cycle.

7 Claims, 1 Drawing Sheet

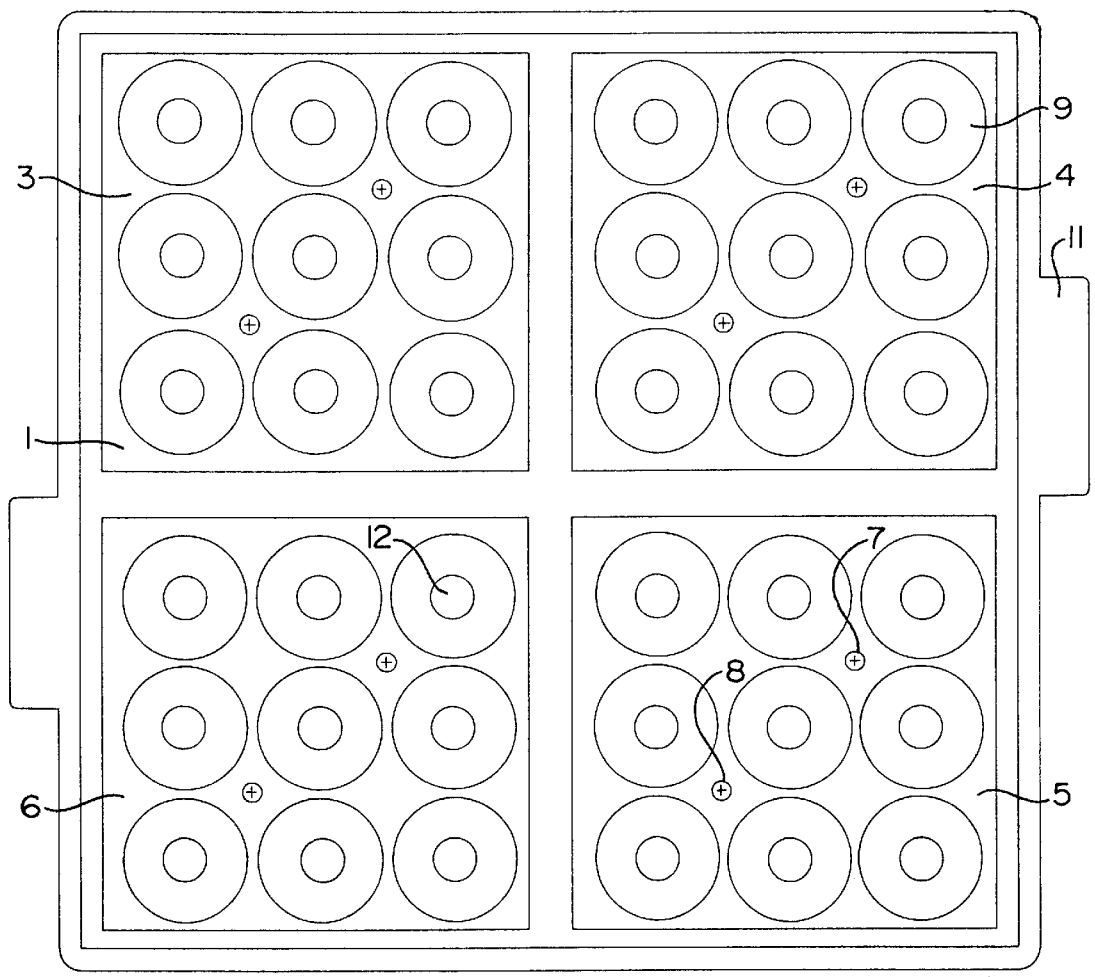
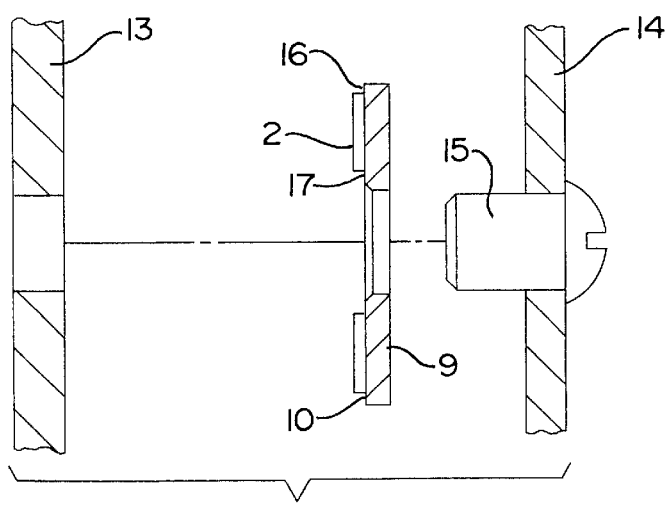

METHODS OF BONDING METAL SURFACES, AND COMPONENTS THEREFOR

The present patent application is claims priority from U.S. Provisional Patent Application Serial No. 60/244,998 filed Nov. 1, 2000, and is a divisional application of U.S. patent application Ser. No. 10/039,722 now U.S. Pat. No. 6,669,428, filed Oct. 24, 2001 in which a Petition to Make Special because of Actual Infringement was granted May 15, 2002.

The present invention relates generally to a method of bonding metal objects in place to facilitate assembly operations, and components used in such a method. More particularly, the present invention relates to a unique process of bonding in place metal objects, at least one of said objects having pre-applied thereto an adhesive epoxy film or tape, and components used in such a process.

BACKGROUND OF THE INVENTION

In the past, many techniques have been tried to make assembly operations, especially in automotive manufacture, more efficient. This has been especially true with respect to the locating of hinge washers in the door hinge assembly processes of automotive vehicles.

The techniques which have been tried in the past are inaccurate, expensive, complicated, cumbersome, slow, and subject to frequent malfunction.

It is a desideratum of the present invention to provide a novel process for bonding metal objects in place, and components used in such process, which avoid the animadversions of the prior art techniques.

SUMMARY OF THE INVENTION

The present invention provides a washer device, comprising: a metal washer; a heat-curable adhesive bonding composition pre-applied to a first major surface of said metal washer; and said heat-curable adhesive bonding composition being capable of being cured to bond said first major surface of said metal washer to an external metal substrate when first major surface of said metal washer with said pre-applied heat-curable adhesive bonding composition is brought into intimate contact with said external metal substrate and is subjected to a predetermined heating until said pre-applied heat-curable adhesive composition cures to bond said first major surface of said metal washer and said external metal substrate together.

The present invention also provides a method of bonding a first metallic object to a second metallic object, comprising the steps of: applying a heat-curable adhesive bonding composition to a predetermined percentage of a predetermined metallic surface of said first metallic object; bringing said heat-curable adhesive bonding composition applied to said predetermined metallic surface said first metallic object into intimate contact with a predetermined metallic surface of said second metallic object; and while said intimate contact is maintained, subjecting said applied heat-curable adhesive bonding composition to heat until said adhesive composition cures to bond said predetermined metallic surfaces together.

The present invention further provides a fabricated tape assembly, comprising: a release paper backing member; a film of structural epoxy adhesive applied to said release paper backing member; said film of structural epoxy adhesive being cut or perforated into a series of adhesive annuli; said tape assembly being cut or perforated into a series of square tape sections; and each said square tape section containing a predetermined and pre-arranged array of said adhesive annuli.

The present invention also provides a tray device which serves as a shipping tray and an assembly fixture to align a fabricated tape assembly for washers, comprising: a main tray member divided into a predetermined number of square tray sections; two locating pins being provided in each said square section; and a plurality of posts affixed to said main tray member in each said square tray section.

The present invention further provides a method of bonding metal surfaces, comprising the steps of applying an adhesive epoxy film or tape to a first metal surface of a first object, wherein said adhesive epoxy film or tape is capable of withstanding production phosphating solutions, cathodic electro-coat primer solutions, and cathodic electro-primer bake temperatures. The adhesive epoxy film or tape applied to the first object is then brought into intimate contact with a second metal surface of a second object. Thereafter, the first metal surface, the adhesive epoxy film or tape, and the second metal surface are subjected to cathodic electro-coat baking until the adhesive epoxy film or tape cures to bond the first and second metal surfaces together.

An object of the present invention is to provide a method of bonding as described hereinabove by preparing a die-cut cast epoxy film or tape on a release paper backing which is formed into predetermined shapes in accordance with the first metal surface to be bonded.

Another object of the present invention is to provide a method as described hereinabove which utilizes a high strength, heat cure, pre-applied, low tack, cast structural epoxy film or tape.

Yet a further object of the invention is to provide such an adhesive epoxy film or tape at a defined thickness and shape which is most efficient for the bonding of metal substrates as an assembly aid to post processing.

Another object of the invention is to provide such a method as described hereinabove for use in the bonding of steel locating hinge washers to the hinge assembly, to facilitate doors-off, doors-on processing through the trim shop and automotive assembly.

Yet a further object is to provide a method as described hereinabove wherein the adhesive epoxy cures during the cathodic electro-coat primer bake in assembly.

These and other objects, advantages and features of the present invention will become apparent to those persons skilled in this area of technology and to others when reading the detailed description set forth hereinbelow in conjunction with the accompanying drawings.

BRIEF DESCRIPTION OF THE DRAWING

FIG. 1 is a top plan view of a novel shipping/assembly fixture tray of the present invention having assembled thereon a plurality of metal washers on top of adhesive tape.

FIG. 2 depicts a cross-sectional drawing illustrating the assembly process for bringing the metal objects into intimate contact with each other prior to bonding.

DETAILED DESCRIPTION OF SOME PREFERRED EMBODIMENTS OF THE PRESENT INVENTION

A first preferred embodiment of the present invention will now be described.

First, there is fabricated tape comprising a backing or release paper 1 having applied thereto a film of structural epoxy adhesive. For example, the release paper 1 may preferably, but not necessarily, constitute treated polyethylene coated kraft paper. Furthermore, the adhesive epoxy may preferably, but not necessarily, constitute a structural adhesive supplied by 3M Corporation which is designated AF-126(0.08 wt).

The tape assemblage of the release paper 1 with its structural adhesive film thereon is then die cut into predetermined shapes and predetermined dimensions. For example, such an assemblage may be cut or perforated into a series of adhesive annuli 2, with a plurality of said adhesive annuli 2 in a predetermined perforated section of such tape assemblage. For example, the tape assemblage may be cut or perforated into a series of square sections 3, 4, 5 or 6, with each such square section 3, 4, 5 or 6 containing a three-by-three array of nine such adhesive annuli 2.

Four of such sections 3, 4, 5 and 6, each containing a three-by-three array of nine adhesive annuli 2, are placed in a shipping/assembly fixture tray 11 as illustrated in FIG. 1. Each square section 3, 4, 5 or 6 is placed on the two associated locating pins 7 and 8 and nine posts 12 of the tray 11 with the adhesive annuli 2 of the tape assemblage facing upwardly.

A plurality of metal washers 9 which are countersunk on one side 10 thereof are fabricated. The tray 11 serves as a shipping tray as well as an assembly fixture to align the die cut tape for the washers 9. For each square section 3, 4, 5 and 6 in the shipping/assembly fixture tray 11, there are placed nine such countersunk washers 9 with the countersunk surface 10 abutting an associated epoxy adhesive annulus 2.

The shipping/assembly tray is provided with a plurality of male protruding members or posts 12 upon which the release paper 1 with the adhesive annuli 2 are placed, and on top of which there are placed the washers 9.

The shipping/assembly tray 11 as depicted in FIG. 1 is then sent to the automotive assembly plants. A typical application includes the bonding of steel locating hinge washers 9 in the hinge assembly to facilitate doors-off, doors-on processing through the trim shop.

When each washer 9 is removed from the tray 11, the adhesive annulus 2 adheres to the countersunk side 10 of the washer 9 due to the tackiness of the adhesive annulus 2.

Each washer 9 is placed in a sandwich-like relation between two portions 13 and 14 of the hinge assembly and maintained in intimate contact therewith by way of a threaded bolt 15.

During the heat cure cycle, the adhesive annulus 2 is maintained in intimate, positive contact with both of the metal surfaces being bonded, to insure adequate bonding performance and maximize bond surface area. The epoxy annulus 2 has predetermined dimensions to be concentric with the washer 9, but not coterminous therewith. Predetermined annular spaces 16 and 17 are provided within which the epoxy adhesive may spread without running over the edges of the washer 9, and yet ensuring an adequate bonding performance.

The adhesive epoxy material is suitable for applications bonding metal surfaces, such as galvanized, galvanneal, and cold rolled steel, which may be coated with metal forming lubricants. This special adhesive withstands production phosphating solutions, cathodic electro-primer solutions, and cathodic electro-primer bake temperatures.

After the adhesive cures during the cathodic electro-primer bake and assembly, the hinge portions 13 and 14 can be disassembled leaving the steel locating hinge washer 9 in place for later assembly.

The method includes all variations wherein application of the epoxy adhesive material can be at any point prior to the cathodic electro-coat bake in the body shop area of assembly or in the stamping plant.

Preferably, but not necessarily, the epoxy adhesive is not resistance weld-through capable. through capable.

Various modifications of the process and the components therefore as described hereinabove are contemplated by the present invention. Therefore, while there have been set forth some preferred embodiments of the present invention, it should be understood that the present invention is not to be limited or restricted to the particular embodiments described in detail hereinabove which have been set forth for illustrative purposes only

We claim:

1. A method of bonding a metal washer to a portion of a hinge assembly, comprising the steps of:

providing a tape comprising a release paper having applied thereto annuli of a heat-curable adhesive bonding composition;

die-cutting said tape into a series of square sections, with each said square section containing a square array of adhesive annuli;

placing four said sections in a shipping/assembly fixture tray with each said adhesive annuli positioned on a corresponding post of said shipping/assembly fixture tray;

placing a metal washer on each said post so that said metal washer abuts an associated adhesive annulus;

removing one of said washers from said tray, whereby the associated adhesive annulus adheres to a predetermined metallic surface of said washer due to the tackiness of said associated annulus;

placing said metal washer with its adhered to adhesive annulus in a sandwich-like relation between two portions of said hinge assembly;

applying said heat-curable adhesive bonding composition to only a predetermined percentage of said predetermined metallic surface of said metal washer so that said heat-curable adhesive bonding composition is concentric with said metal washer, but not coterminous with said metal washer;

bringing said heat-curable adhesive bonding composition applied to said predetermined metallic surface of said metal washer into intimate contact with a predetermined metallic surface of said portion of said hinge assembly; and while said intimate contact is maintained, subjecting said applied heat-curable adhesive bonding composition to heat until said adhesive composition cures to bond said predetermined metallic surfaces together; and said heating is accomplished by subjecting said predetermined metallic surfaces and said adhesive composition to cathodic electro-coat primer baking until said adhesive composition cures to bond said predetermined metallic surfaces together.

2. A method of bonding a metal washer to a portion of a hinge assembly, comprising the steps of:

providing a tape comprising a release paper having applied thereto annuli of a heat-curable adhesive bonding composition;

die-cutting said tape into a series of square sections, with each said square section containing a square array of adhesive annuli;

placing four said sections in a shipping/assembly fixture tray with each said adhesive annuli positioned on a corresponding post of said shipping/assembly fixture tray;

placing a metal washer on each said post so that said metal washer abuts an associated adhesive annulus;

removing one of said washers from said tray, whereby the associated adhesive annulus adheres to a predetermined metallic surface of said washer due to the tackiness of said associated annulus;

placing said metal washer with its adhered to adhesive annulus in a sandwich-like relation between two portions of said hinge assembly;

applying said heat-curable adhesive bonding composition to only a predetermined percentage of said predetermined metallic surface of said metal washer;

bringing said heat-curable adhesive bonding composition applied to said predetermined metallic surface of said metal washer into intimate contact with a predetermined metallic surface of said portion of said hinge assembly;

while said intimate contact is maintained, subjecting said applied heat-curable adhesive bonding composition to heat until said adhesive composition cures to bond said predetermined metallic surfaces together; and said heating is accomplished by subjecting said predetermined metallic surfaces and said adhesive composition to cathodic electro-coat primer baking until said adhesive composition cures to bond said predetermined metallic surfaces together.

3. The method according to claim 1, wherein:

said adhesive bonding composition maintains an intimate positive contact with said predetermined metallic surfaces during a predetermined heat cycle.

4. The method according to claim 2, wherein:

said adhesive bonding composition maintains an intimate positive contact with said predetermined metallic surfaces during a predetermined heat cycle.

5. A method of bonding a metal washer to a portion of a hinge assembly, comprising the steps of:

providing a tape comprising a release paper having applied thereto annuli of a heat-curable adhesive bonding composition;

die-cutting said tape into a series of square sections, with each said square section containing a square array of adhesive annuli;

placing four said sections in a shipping/assembly fixture tray with each said adhesive annuli positioned on a corresponding post of said shipping/assembly fixture tray;

placing a metal washer on each said post so that said metal washer abuts an associated adhesive annulus;

removing one of said washers from said tray, whereby the associated adhesive annulus adheres to a predetermined metallic surface of said washer due to the tackiness of said associated annulus;

placing said metal washer with its adhered to adhesive annulus in a sandwich-like relation between two portions of said hinge assembly;

said adhesive composition is capable of withstanding production phosphating solutions, cathodic electro-coat primer solutions, and/or cathodic electro-primer bake temperatures;

bringing said adhesive composition applied to said metal washer into intimate contact with a metallic surface of said portion of said hinge assembly; and subjecting said metallic surfaces and said adhesive composition to cathodic electro-coat baking until said adhesive composition cures to bond said metallic surfaces together.

6. The method according to claim 5, wherein:

said adhesive composition comprises a high strength, heat-curable, pre-applied, low tack, cast structural epoxy film or tape.

7. The method according to claim 6, including:

providing said adhesive epoxy film or tape at a defined thickness and shape which is efficient for the bonding of metal substrates as an assembly aid to post processing.

* * * * *